A. S. BALLARD.
Ditching-Plow.
No. 29,647.
Patented Aug. 14, 1860.
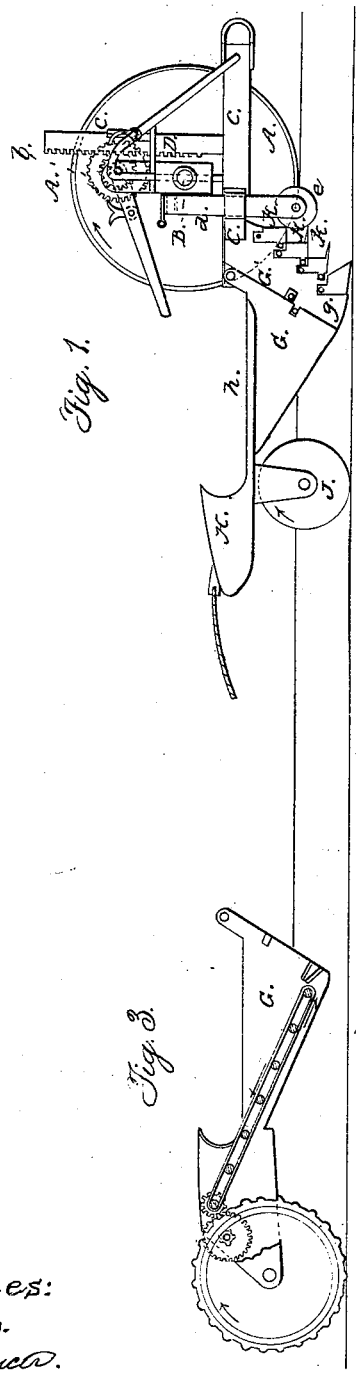
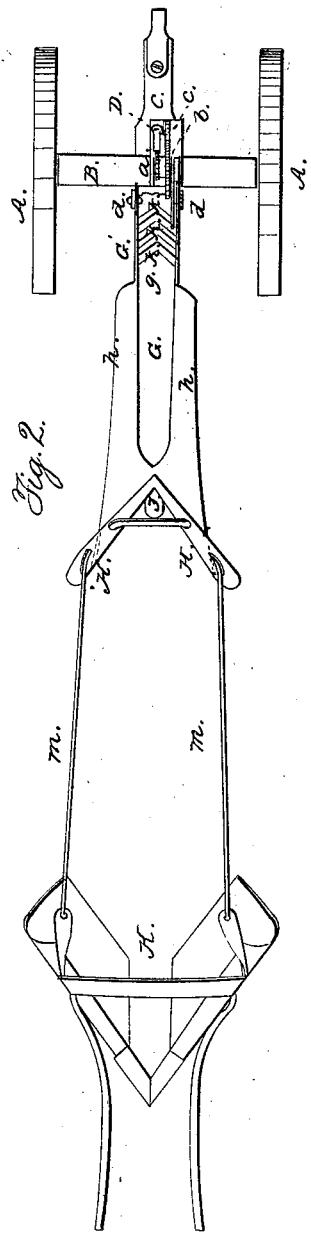
Witnesses:
J. W. Coombs.
R. S. Spencer.
Inventor:
A S Ballard
per Munn & Co
Attys.

UNITED STATES PATENT OFFICE.

ALLEN S. BALLARD, OF MOUNT PLEASANT, IOWA, ASSIGNOR TO HIMSELF AND JOSEPH HOWE, OF SAME PLACE.

IMPROVEMENT IN DITCHING-MACHINES.

Specification forming part of Letters Patent No. 29,647, dated August 14, 1860.

*To all whom it may concern:*

Be it known that I, ALLEN S. BALLARD, of Mount Pleasant, in the county of Henry and State of Iowa, have invented certain new and useful Improvements in Ditching-Machines; and I do hereby declare that the following is a full, clear, and exact description of the same, reference being had to the accompanying drawings, making a part of this specification, in which—

Figure 1 represents a side elevation of the machine with one wheel removed to show the mechanism for raising or depressing the cutters, &c. Fig. 2 is a plan view of Fig. 1 with the scraper shown attached in rear of the machine. Fig. 3 is a longitudinal vertical section taken through a plow, showing an endless-apron elevator.

Similar letters of reference indicate corresponding parts in the three figures.

This invention has for its object the sinking of ditches in a more perfect and cheaper manner by a machine which is specially adapted to the purpose, which will plow the earth, loosen it, and at the same time conduct it to the surface of the ditch and throw it off some distance from the sides thereof, so that there will be little liability of the earth falling back into the ditch.

The invention provides for accomplishing the work of ditching in a rapid manner and with comparatively little labor, and requiring little attention.

My invention to effect these ends consists in constructing a plow with an inclined bottom and furnishing it with a series of cutters and wings, arranged in such a way, and combined with two carrying-wheels and an adjustable mechanism, that the plow will dig into the earth any desirable depth to form a ditch or trench and elevate the earth as rapidly as it is loosened by the plow-cutters, which, after being elevated to the surface, will be thrown off from each side of the ditch by the wings of the plow and a scraper that follows in the rear of the machine, all as will be hereinafter described and represented.

To enable those skilled in the art to make and use my invention, I will proceed to describe its construction and operation.

In the drawings, A A are two carriage-wheels, and B is their axle-tree.

C is a strong beam, that is supported under the axle-tree by a standard, D, the back edge of which is provided with rack-teeth, which engage with the teeth of a pinion-wheel, $a$, the shaft of which pinion carries a large spur-wheel, $b$, that is actuated by a lever and pawl, so as to raise or depress the standard, and consequently the beam C.

$c$ is a dog for holding the beam C in any desirable position at which it may be set. The beam C projects out in front of the axle B, and has a clevis on its end to which the draft-chain is to be attached. The beam also projects out in rear of the axle-tree, and to this portion is attached the plow G and two adjustable vertical standards, $d\ d$, that carry on their lower ends vertical rotary cutters $e\ e$, Fig. 1, which precede the plow-cutters and cut into the earth the width of the ditch, so as to cut down the sides of the ditch.

The plow G consists of two perpendicular sides and an inclined bottom that extends from the point $g$ to a point nearly on a horizontal plane with the bottom of the beam C, and from the top edges of the two sides of the plow project out shelves $h\ h$, which terminate at the rear end of the plow in two concave wings, H H, that receive the earth after it has been elevated to the surface and discharge it some distance from the edges of the ditch.

J is a wheel that supports the rear end of the plow G, which wheel runs in the bottom of the ditch. $k\ k\ k$ are pointed cutters that are placed in front of the plow, arranged one above the other, and each one in advance of other, so that the highest one in deep ditching will commence to cut first, then the next, and so on, each one cutting a horizontal slice, which falls on the inclined plane, is elevated, and thrown off from each side of the ditch.

In rear of the machine is attached by chains $m\ m$ a scraper, K, which is guided and controlled by a man holding the handles shown attached to it. This scraper is intended for covering the ditch again after it has been boarded over. The plow is divided into two main parts—the front part, G', which is attached securely and permanently to the beam C, and the part G, which is attached to the beam and to the vertical sides of the front portion, G', by lugs fitting into dovetail recesses.

Now, for very heavy and tough land, where the friction on the sides and inclined bottom of the plow would increase the draft to a very great extent, in the plow just described the portion G is removed, and the plow-body of Fig. 3 is to be attached in its stead. This portion of Fig. 3 may be of the same shape and proportions as that lettered G; but instead of a fixed bottom a movable bottom is used, which consists of an endless apron that is operated by the supporting-wheel through the medium of suitable gearing, as shown in Fig. 3, so as to conduct the earth from the point of the plows up and back to the wings that throw it off on each side of the ditch. This elevating-apron prevents the friction that takes place in the plow of Figs. 1 and 2, and greatly assists in raising and discharging the earth as the machine is drawn along.

From this description the operation of the machine will be very plain. It is drawn along by any convenient power, and the depth of ditch or drain increased by lowering the plow, the wheels A running on each side of the drain.

Having thus described my invention, what I claim as new, and desire to secure by Letters Patent, is—

The plow G G', constructed substantially as described, with or without the movable bottom, in combination with the horizontal cutters $k\ k\ k$, cutters $e\ e$, and carriage A B, the whole being arranged and operating in the manner and for the purposes herein set forth.

ALLEN S. BALLARD.

Witnesses:
 M. H. STOWE,
 W. D. LEEDHAM.